United States Patent
Ruan et al.

(10) Patent No.: US 12,504,896 B2
(45) Date of Patent: Dec. 23, 2025

(54) MEDIA SCAN METHOD TO REDUCE ACTIVE IDLE POWER OF MEMORY DEVICES

(71) Applicant: Micron Technology, Inc., Boise, ID (US)

(72) Inventors: Dengfeng Ruan, Shanghai (CN); Peng Fei, Shanghai (CN)

(73) Assignee: Micron Technology, Inc., Boise, ID (US)

(*) Notice: Subject to any disclaimer, the term of this patent is extended or adjusted under 35 U.S.C. 154(b) by 59 days.

(21) Appl. No.: 18/423,272

(22) Filed: Jan. 25, 2024

(65) Prior Publication Data

US 2024/0295972 A1    Sep. 5, 2024

Related U.S. Application Data

(60) Provisional application No. 63/449,465, filed on Mar. 2, 2023.

(51) Int. Cl.
*G06F 3/06* (2006.01)

(52) U.S. Cl.
CPC .......... *G06F 3/0625* (2013.01); *G06F 3/0659* (2013.01); *G06F 3/0679* (2013.01)

(58) Field of Classification Search
CPC ..... G06F 3/0625; G06F 3/0679; G06F 3/0634
See application file for complete search history.

(56) References Cited

U.S. PATENT DOCUMENTS

| | | |
|---|---|---|
| 2006/0190752 A1 | 8/2006 | Lee |
| 2011/0213992 A1 | 9/2011 | Satsangi et al. |
| 2012/0151238 A1 | 6/2012 | Yang |
| 2015/0012671 A1 | 1/2015 | Park et al. |
| 2015/0193027 A1* | 7/2015 | Robinson .............. G06F 3/0238 345/179 |
| 2018/0102776 A1* | 4/2018 | Chandrasekar ....... G06F 1/3287 |
| 2019/0279704 A1* | 9/2019 | Derner .................. G06F 3/0679 |
| 2022/0091932 A1 | 3/2022 | Kim et al. |

FOREIGN PATENT DOCUMENTS

AU    2012200911 A1 *  2/2013

OTHER PUBLICATIONS

International Search Report and Written Opinion for International Application No. PCT/US2024/018116, mailed Jun. 21, 2024, 08 Pages.

* cited by examiner

*Primary Examiner* — Nicholas A. Paperno
(74) *Attorney, Agent, or Firm* — Lowenstein Sandler LLP

(57) ABSTRACT

A method for reducing active idle power is a memory device includes incrementing, by a first processing device, a first counter when no read or write requests are received from a host system within a first predetermined period of time, and in response to determining that the first counter has reached a first predetermined threshold value, transitioning to a sleep mode. The method also includes incrementing, by a second processing device, a second counter when no read or write requests are received from the host system within a second predetermined period of time, and in response to determining that the second counter has reached a second predetermined threshold value, transitioning to the sleep mode.

20 Claims, 8 Drawing Sheets

MEDIA SCAN METHOD TO REDUCE ACTIVE IDLE POWER OF MEMORY DEVICES

CROSS REFERENCE TO RELATED APPLICATIONS

This non-provisional application claims priority of Provisional Patent Application No. 63/449,465, titled "MEDIA SCAN METHOD TO REDUCE ACTIVE IDLE POWER OF MEMORY DEVICES," filed on Mar. 2, 2023, the entire contents of which is incorporated herein by reference.

TECHNICAL FIELD

Embodiments of the disclosure relate generally to memory sub-systems, and more specifically, relate to systems and methods for reducing active idle power of memory devices in memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
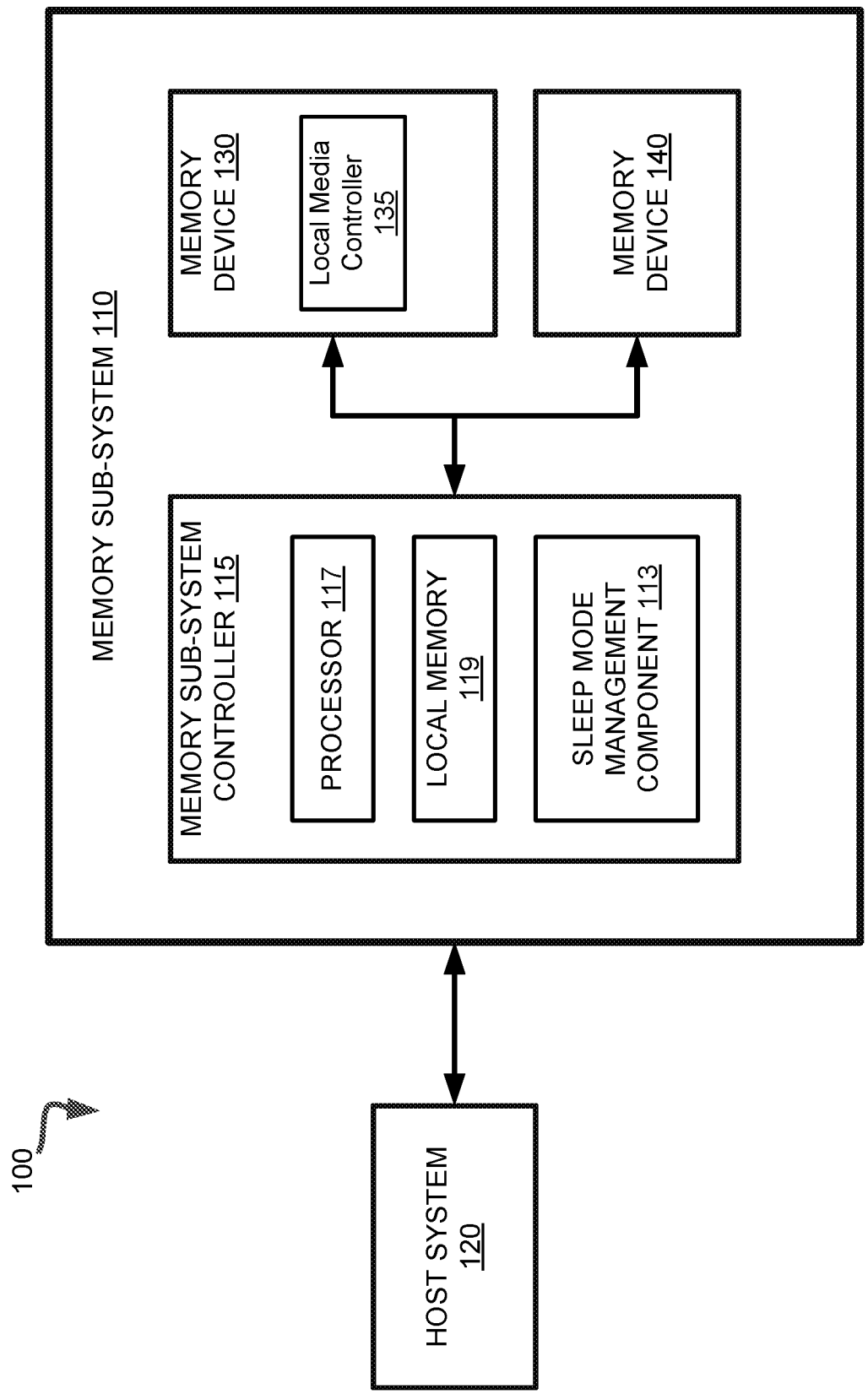
FIG. 1 illustrates an example computing system that includes a memory sub-system in accordance with some embodiments of the present disclosure.

Aspects of the present disclosure are directed to systems and methods for reducing active idle power of a memory device. Active idle power is power consumed by a memory device in an active idle state. A memory device is in active idle state when there are no read or write operations being performed by a host system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a not-and (NAND) memory device. Other examples of non-volatile memory devices are described below in conjunction with FIG. 1. Each of the memory devices can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single-level cell (SLC) can store one bit of information and has two logic states. Similarly, a multi-level cell (MLC) can store two bits per cell, a triple-level cell (TLC) can store three bits per cell, a quad-level cell (QLC) can store four bits per cell, and a penta-level cell (PLC) can store five bits per cell. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

When performing memory access operations, such as read operations (e.g., in response to a received memory access request/command), a memory sub-system can correct the errors present in the data being read. For example, upon reading data from a memory device, the memory sub-system controller can perform an error detection and correction operation. The error detection and correction operation includes identifying one or more errors (e.g., bit flip errors) in the read data. The memory sub-system can have the ability to correct a certain number of errors per management unit (e.g., using an error correction code (ECC)). As long as the number of errors in the management unit is within the ECC capability of the memory sub-system, the errors can be corrected before the data is provided to the requestor (e.g., the host system). The fraction of bits that contain incorrect data before applying ECC is called the raw bit error rate (RBER). The fraction of bits that contain incorrect data after applying ECC is called the uncorrectable bit error rate (UBER). In an attempt to prevent those same errors from being present when a subsequent memory access operation is performed on the same management unit (e.g., a block or a page or a superblock), the memory sub-system can perform a writeback operation. In a writeback operation, the data from the management unit is overwritten with the corrected data that was just read from the memory device. Thus, any errors that were present in the data when it was read will be corrected so that those errors are not present going forward.

Some not-and (NAND) memory devices, however, experience an increase in raw bit error rate (RBER) over time due to charge loss and/or charge gain. If not dealt with in an efficient manner, this can lead to a large threshold voltage (Vt) distribution valley margin, resulting in degradation of data on the NAND page, which may result in increased bit error count and may eventually result in data loss. Therefore, a media scan operation can be performed at regular intervals in order to meet the data retention requirements of the memory device. However, the time required to perform a super page scan can be long. During the media scan operation, multiple processors within the memory sub-system controller are invoked as each processor maintains a separate clock. For example, a flash translation layer processor within the sub-system controller may send a scan request to a back-end processor to get the RBER of the scanning page, and may trigger a valley health check scan if the RBER is greater than a threshold value. Similarly, when a media scan operation invokes a firmware module, the corresponding hardware blocks are also invoked, including the memory sub-system controller, dynamic random access memory (DRAM), and NAND devices. Such activity may increase peak power used by the SSD in an active idle state, which is also referred to hereinafter as the "sleep mode," and because the memory sub-system controller is entering and exiting sleep mode every time it receives a "wake-up" signal from each of the processors, the sleep interval between two consecutive media scan operations can be short. The SSD may initiate some power saving mechanisms, such as processor sleep, clock reduction, or DRAM self-refresh, in order to meet active idle power expectations. However, when such power saving mechanisms are applied, the drive's functionality and data integrity may be compromised, and the effect is more pronounced in higher capacity SSDs.

Accordingly, one embodiment of the present disclosure is a method for reducing active idle power or power consumed by a memory device in sleep mode. The method includes decoupling some of the processors from the input/output read processor such that the decoupled processors can continue to perform the required media scan operations, but the input/output read processor and the input/output interface between the memory sub-system controller and the host system can transition to sleep mode to reduce active idle power. The method further includes combining two or more media scan operations and performing a burst scan operation such that the sleep interval between one burst scan operation and a subsequent burst scan operation is increased. In some embodiments, the memory sub-system controller may perform media scan operations on multiple channels on the open NAND flash interface (ONFI) bus, simultaneously. In some embodiments, the memory sub-system controller may perform burst scan operations on multiple channels on the ONFI bus, simultaneously, such the sleep interval between one burst scan operation and a subsequent burst scan operation is increased, and subsequently the active idle power in sleep mode is reduced.

Advantages of this approach include, but are not limited to, reduced active idle power in memory devices. For example, memory devices, regardless of form factor or capacity, using methodologies described here use less than 5 Watts over a period of 30 seconds in active idle mode. Energy savings are amplified in end applications such as data center SSDs. The methods disclosed provide an optimized active idle mode detection and control method by decoupling the I/O path from media scan operations so the I/O path can enter sleep mode more frequently. The methods disclosed also provide an optimized media scan method in sleep mode such that the media scan operations and the corresponding hardware blocks have additional opportunities to enter sleep mode. The methods disclosed also provide a media scan submodule quiesce during sleep mode to further reduce power used by the hardware blocks. Memory devices using media scan methods described in the present disclosure can easily comply with requirements of Open Compute Project (OCP), which requires that the active idle power be less than 5 Watts.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a Zoned Namespace (ZNS) SSD, a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include not-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single-level cells (SLC) can store one bit per cell. Other types of memory cells, such as multi-level cells (MLCs), triple-level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks (e.g., superblocks). A "superblock" refers to a set of physical blocks that include a physical block from each plane within a corresponding group, and a superblock can span across multiple memory devices.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130).

In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system 110 includes a sleep mode management component 113 that receives clock signals (e.g., sleep signal) from various processors, such as those represented by processor 117. The sleep mode management component 113 decouples (e.g., at a firmware and/or control signal level) some of the processors from the input/output read processor such that the decoupled processors can continue to perform the required media scan operations, but the input/output read processor and the input/output interface between the memory sub-system controller 115 and the host system 120 can transition to sleep mode to reduce active idle power. Subsequently, when a wake-up event occurs, such as receiving a read or write command from the host system 120, receiving a PCIe reset request from the host system 120, or any other command from the host system 120, the sleep mode management component 113 may resume normal operations (e.g., drive activities) for the memory sub-system 110.

In some embodiments, the memory sub-system controller 115 includes at least a portion of the sleep mode management component 113. For example, the memory sub-system controller 115 can include a processor 117 (e.g., a processing device) configured to execute instructions stored in local memory 119 for performing the operations described herein. In other embodiments, the sleep mode management component 113 is part of memory sub-system 110, but is separate from memory sub-system controller 115. In other embodiments, local media controller 135 includes at least a portion of the sleep mode management component 113 and is configured to perform the functionality described herein. In some embodiments, processor 117 may combine two or more media scan operations and performs a burst scan operation such that the sleep interval between one burst scan operation and a subsequent burst scan operation is increased. In some embodiments, processor 117 may perform media scan operations on multiple channels on an ONFI bus connecting the memory sub-system controller 115 to the one or more memory devices 130, simultaneously. In some embodiments, processor 117 may perform burst scan operations on multiple channels on the ONFI bus, simultaneously, such the sleep interval between one burst scan operation and a subsequent burst scan operation is increased, and subsequently the active idle power in sleep mode is reduced.

Figure 2:
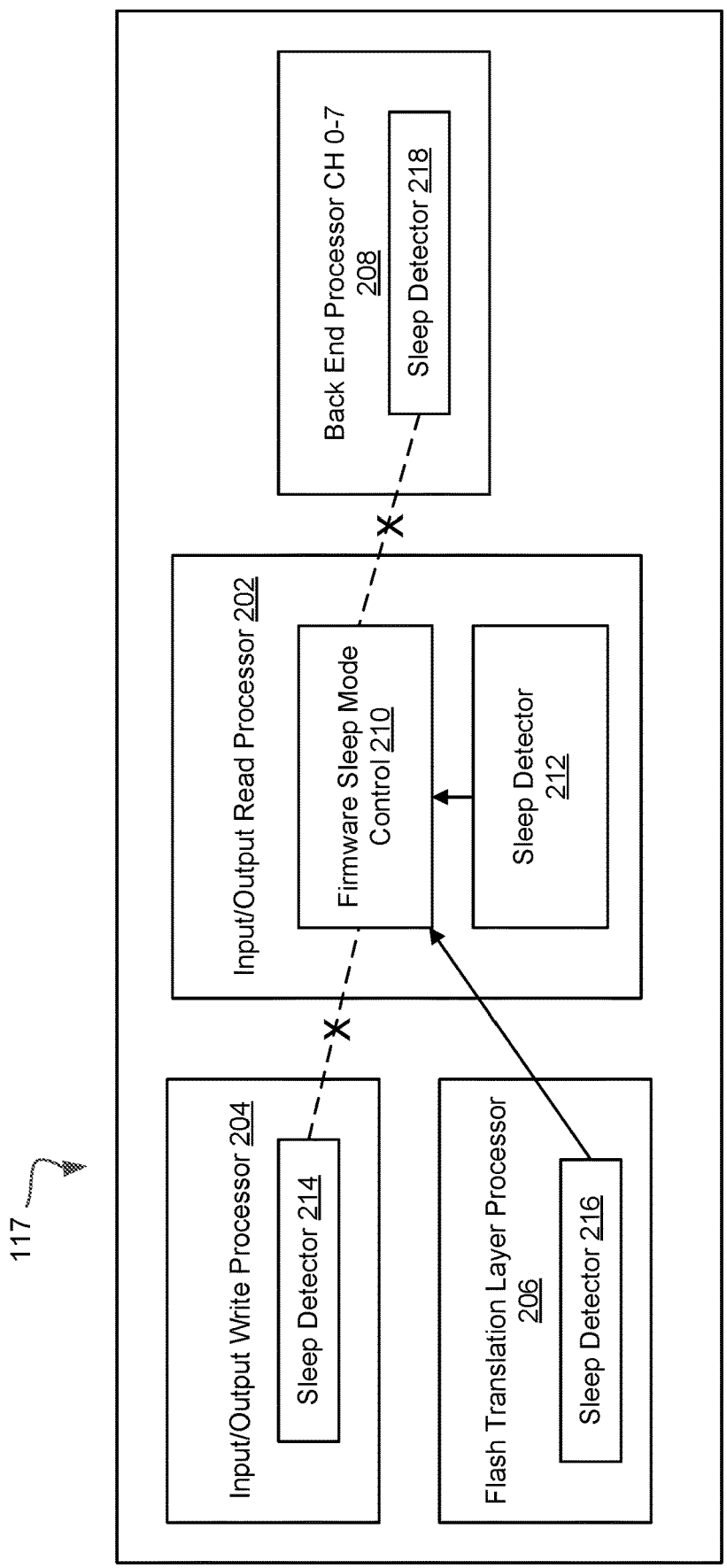
FIG. 2 illustrates a block diagram of a processor in a memory sub-system, in accordance with some embodiments of the present disclosure.

FIG. 2 illustrates a block diagram of processor 117 in the memory sub-system 110, in accordance with some embodiments. Processor 117 may include an input/output read processor 202. Processor 202 may be responsible for handling input/output (I/O) requests received from the host system 120, ensuring data integrity and efficient storage, and managing the underlying NAND flash memory (e.g., memory device 130). When the processor 202 handles I/O requests, it performs a number of operations on both the requests and the data. For requests, the processor 202 schedules them in a manner that ensures correctness and provides high performance. For data, the processor 202 may scramble the data to improve raw bit error rates, perform ECC encoding/decoding, and in some cases compresses/decompresses and/or encrypt/decrypt the data and employ superpage-level data parity. To manage the NAND flash memory, the processor 202 runs firmware that maps host data to physical NAND flash pages, performs garbage collection on flash pages that have been invalidated, applies wear leveling to evenly distribute the impact of writes on NAND flash reliability across all pages, and manages bad NAND flash blocks. Processor 202 may include a firmware sleep mode control 210 and a sleep detector 212. Sleep detector 212 may include a counter that is incremented when no read or write requests are received from the host system 120 within a predetermined period of time. When the counter reaches a predetermined threshold value, the sleep detector may send a sleep signal to the firmware sleep mode control 210, which may transition the memory sub-system 110 to a sleep mode.

Processor 117 may also include a flash translation layer (FTL) processor 206, which may include a separate sleep detector 216. Processor 206 may manage the mapping of logical addresses (i.e., the address space utilized by the host system 120) to physical addresses in the underlying flash memory (e.g., the address space for actual locations where the data is stored, visible only to the memory controller 115) for each page of data. By providing this redirection between address spaces, the FTL can remap the logical address to a different physical address (e.g., move the data to a different physical address) without notifying the host system 120. Whenever a page of data is written to by the host system 120 or moved for underlying SSD maintenance operations (e.g., garbage collection), the old data (e.g., the physical location where the overwritten data resides) is simply marked as invalid in the physical block's metadata, and the new data is written to a page in the flash block that is currently open for writes. Processor 206 is also responsible for wear leveling, to ensure that all of the blocks within the SSD are evenly worn out. By evenly distributing the wear (e.g., the number of PROGRAM AND ERASE cycles that take place) across different blocks, the memory controller 115 reduces the heterogeneity of the amount of wearout across these blocks, thereby extending the lifetime of the device. The wear-leveling algorithm is invoked when the current block that is being written to is full (e.g., no more pages in the block are available to write to), and it enables the controller to select a new block from the free list to direct the future writes to. The wear-leveling algorithm dictates which of the blocks from the free list is selected. One simple approach is to select the block in the free list with the lowest number of PROGRAM AND ERASE cycles to minimize the variance of the wearout amount across blocks. Sleep detector 216 may include a counter that is incremented when no read or write requests are received from the host system 120 within a predetermined period of time. When the counter reaches a predetermined threshold value, the sleep detector may send a sleep signal to the firmware sleep mode control 210, which may transition the memory sub-system 110 to a sleep mode.

In some embodiments, processor 117 may include additional processors, such as I/O write processor 204 and back end processor 208, which may each include their own sleep detector units 214 and 218, respectively. Back end processor 208 may be coupled to each of the memory devices via one or more channels (e.g., channels 0-7) on the ONFI bus connected the memory sub-system controller 115 to the memory devices. However, in the embodiments illustrated in FIG. 2, processor 204 and processor 208 are decoupled from processor 202 (e.g., at a firmware and/or control signal level) such that the decoupled processors (e.g., marked by an 'X') can continue to perform the required media scan operations, but the input/output read processor 202 and the input/output interface between the memory sub-system controller 115 and the host system 120 can transition to sleep mode to reduce active idle power. Subsequently, when a wake-up event occurs, such as receiving a read or write command from the host system 120, receiving a PCIe reset request from the host system 120, or any other command from the host system 120, the processor 202 may resume normal operations (e.g., drive activities) for the memory sub-system 110.

Figure 3:
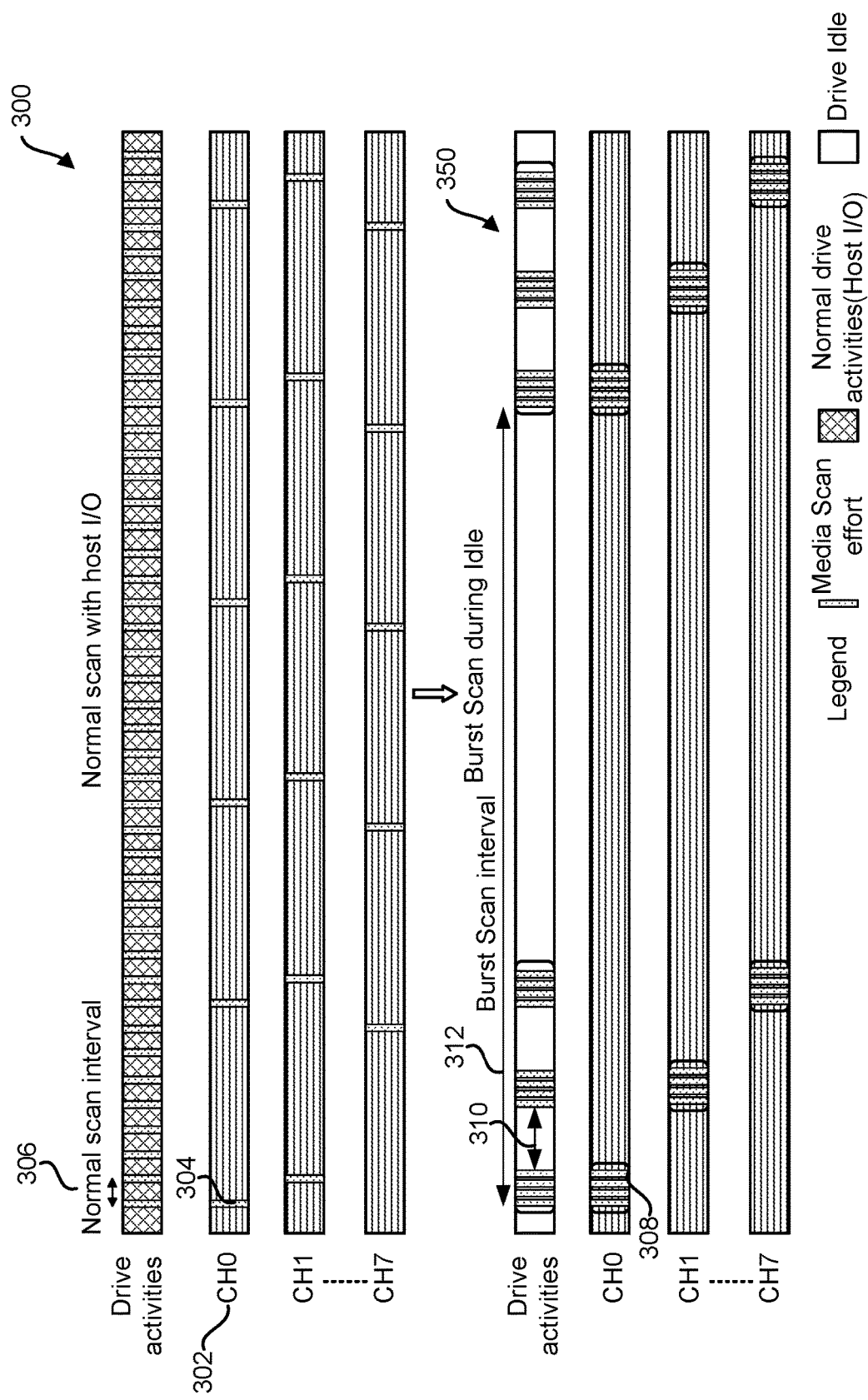
FIG. 3 illustrates a media scan operation for reducing active idle power in a memory device, in accordance with some embodiments of the present disclosure.

FIG. 3 illustrates a method 300 for performing a media scan operation for reducing active idle power in a memory device, in accordance with some embodiments. When processors 202 and 206 are in sleep mode, back end processor 208 may continue to perform media scan operations to maintain data integrity. For example, the media scan operation may include a read operation, a write operation, and or a sensing operation performed on a memory management unit (e.g., a page or a block or a superblock). Under normal operation, back end processor 208 may periodically perform a media scan operation 304 on each ONFI bus channel 302 such that the scan operations are distributed evenly over a certain period of time. The number of scan operations to be performed may depend on the number of pages to be scanned, and this number may vary based on the number of pages in a block, or the number of superpages in a superblock. In some embodiments, as illustrated in method 350, the back end processor 208 determines the number of scan operations to be performed on a memory device, and combines two or more media scan operations 304 and performs a burst scan operation 308 such that the sleep interval 310 between one burst scan operation and a subsequent burst scan operation is increased. This not only results in reduced power between burst scan operations 308 but also a burst scan interval 312 between one burst scan cycle (e.g., spanning all memory blocks in the memory device) and the nest burst scan cycle.

Figure 4A:
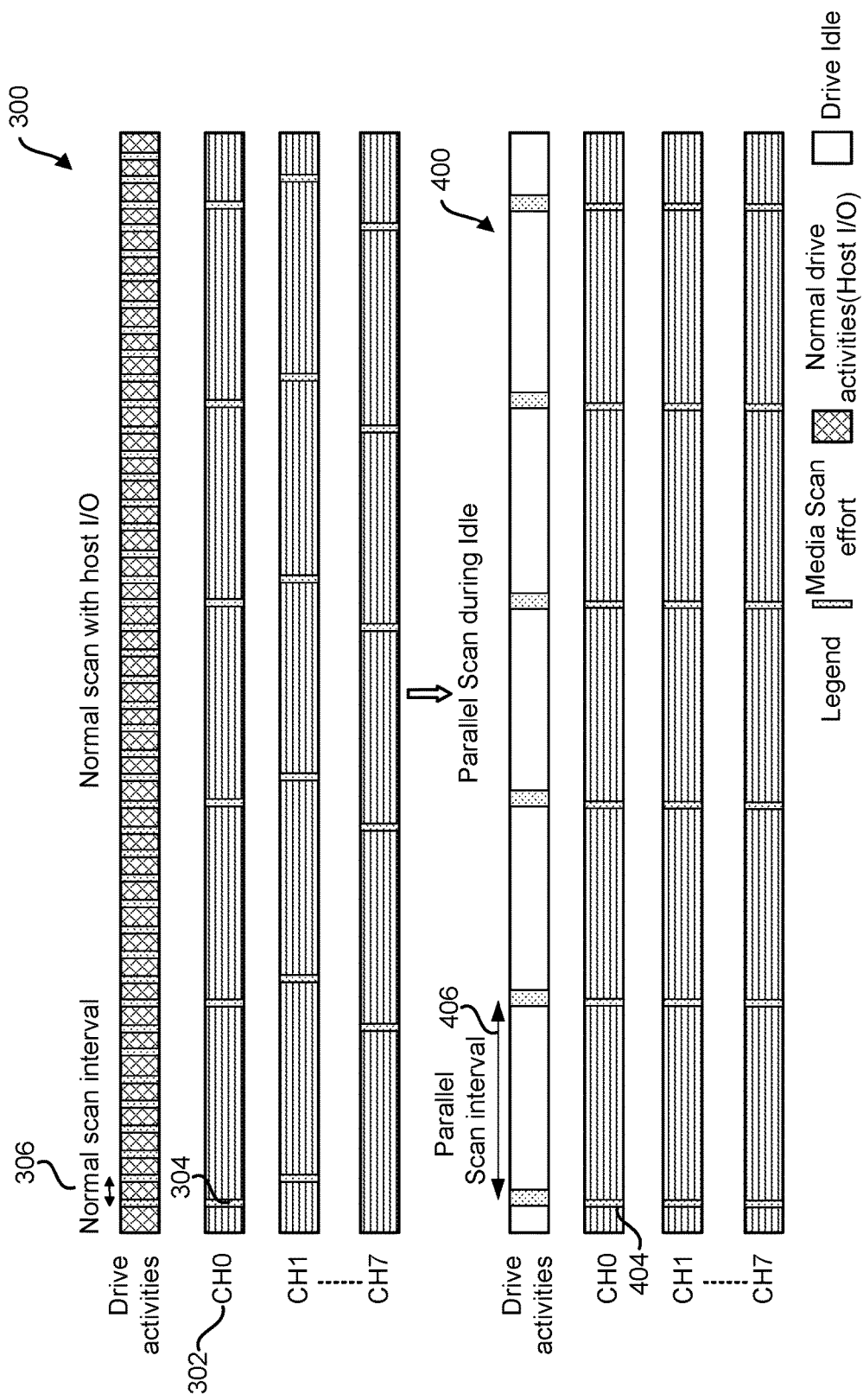
FIG. 4A illustrates a media scan operation for reducing active idle power in a memory device, in accordance with some embodiments of the present disclosure.

FIG. 4A illustrates an alternate method 400 for performing a media scan operation for reducing active idle power in a memory device, in accordance with some embodiments. In this example, when processors 202 and 206 are in sleep mode, back end processor 208 may perform a media scan operation 404 on multiple channels 302 on an ONFI bus connecting the memory sub-system controller 115 and the one or more memory devices 130, simultaneously. As a result, the scan interval 406 between a first scan operation 404 and subsequent scan operation increases, thereby maintaining processors 202 and 206 and the I/O path between the memory controller 115 and the host system 120 in sleep mode for a longer period of time.

Figure 4B:
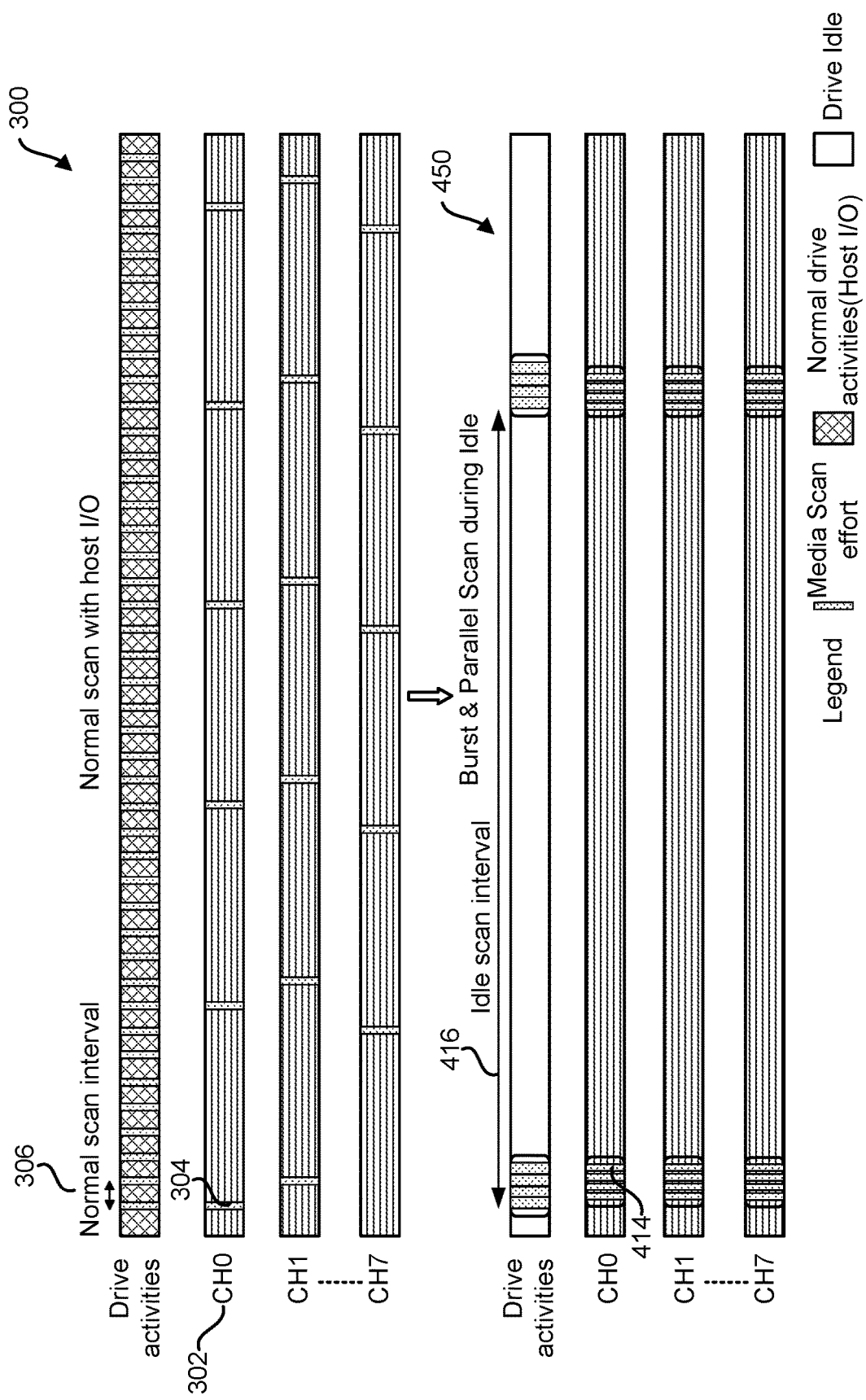
FIG. 4B illustrates a media scan operation for reducing active idle power in a memory device, in accordance with some embodiments of the present disclosure.

FIG. 4B illustrates an alternate method 450 for performing a media scan operation for reducing active idle power in a memory device, in accordance with some embodiments. In this example, the back end processor 208 combines the media scan operations of methods 350 and 400, in that when processors 202 and 206 are in sleep mode, back end processor 208 may perform burst scan operations 414 on multiple channels on the ONFI bus, simultaneously, such the sleep interval or idle scan interval 416 between one burst scan operation and a subsequent burst scan operation is increased significantly, and subsequently the active idle power of the memory sub-system in sleep mode is reduced.

Some operations performed by back end processor 208 do not need any input or control signal from the ONFI bus interface or the decoder or the memory device 140 (e.g., DRAM). For example, operations such as block selection and page selection do not need any input or control signal from the ONFI bus interface or the decoder or the memory device 140. However, the module that perform the scan operation and the error handling module require input from the ONFI bus interface or the decoder. Additionally, the error handling operation and logging operation require input from the memory device 140 (e.g., DRAM).

Accordingly, in some embodiments, when the input/output path connecting the memory controller 115 and host system 120 is in sleep mode, the back end processor 208 may transition the memory device 140 coupled to the memory sub-system controller 115 to a self-refresh mode. When in the self-refresh mode, the memory device 140 is able to refresh itself (e.g., via a read or sense operation) at periodic time intervals. Because the frequency of invoking block selection or page selection or the module performing the scan operation is very high, by placing the memory device 140 in self-refresh mode, the memory controller 115 is able to reduce active idle power significantly.

Figure 5A:
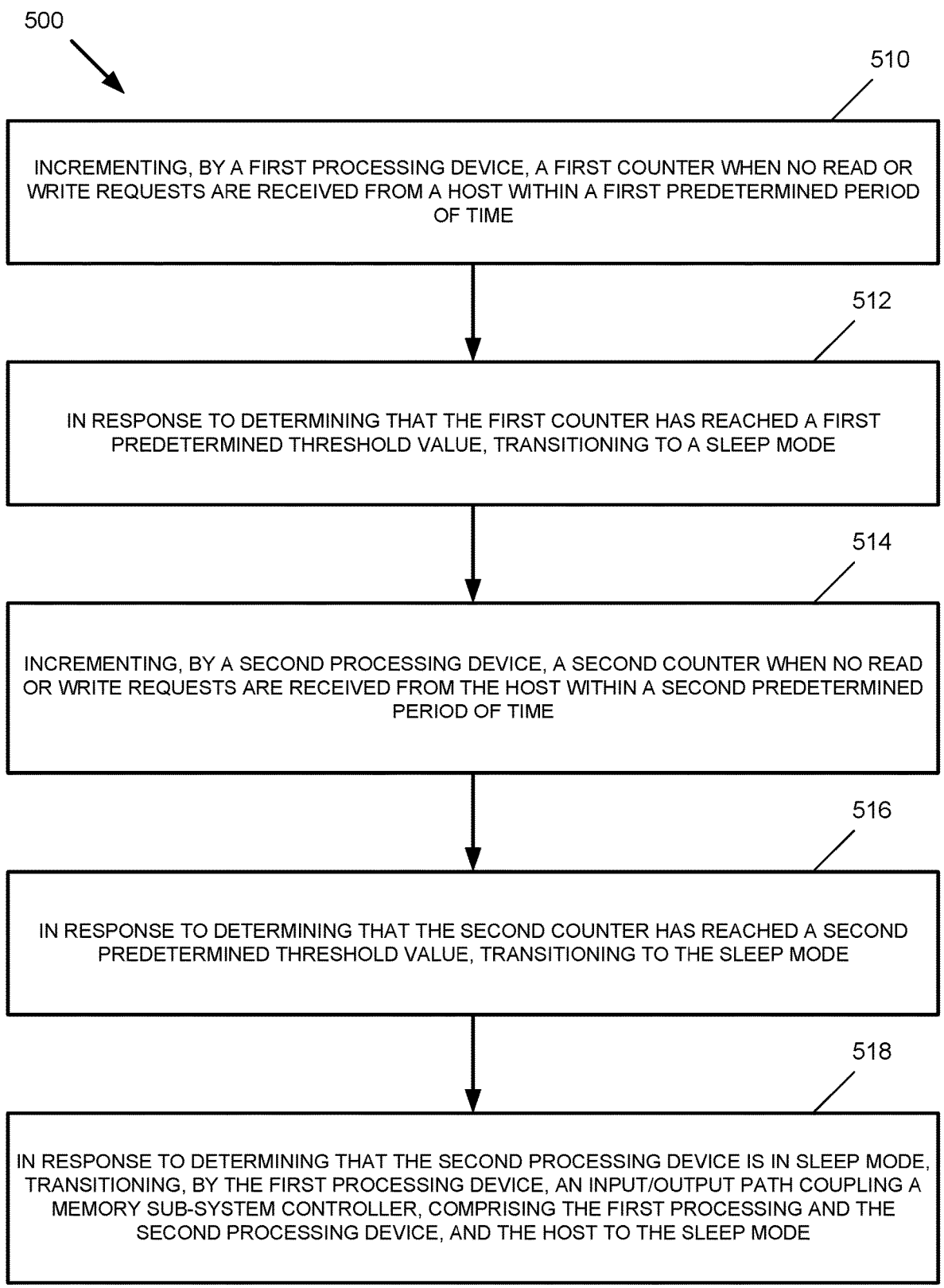
FIG. 5A illustrates a flow diagram of an example method for reducing active idle power in a memory device, in accordance with some embodiments of the present disclosure.

FIG. 5A illustrates example operations in a method 500 for reducing active idle power in a memory device, in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by sleep mode management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic of a processing device (e.g., I/O read processor 202) may increment a counter associated with the processing device when no read or write requests are received from a host system (e.g., host system 120) within a predetermined period of time. At operation 512, when the counter reaches a predetermined threshold value, the processing logic of the processing device may send a sleep signal to the firmware sleep mode control, which may transition the memory sub-system to a sleep mode.

At operation 514, the processing logic of another processing device (e.g., FTL processor 206) may increment a counter associated with the processing device when no read or write requests are received from the host system 120 within a predetermined period of time. At operation 516, when the counter reaches a predetermined threshold value, the processing logic of the processing device may send a sleep signal to the firmware sleep mode control associated with the first processing device, and transition to sleep mode. At operation 518, when the processing logic of the first processing device determines that the second processing device is in sleep mode, the first processing device may transition itself and the I/O path connected the memory sub-system to the host system into sleep mode, thereby reducing active idle power.

The method may also include decoupling from the first processor (e.g., processor 202) from other processors, for example, at a firmware and/or control signal level such that the decoupled processors can continue to perform the required media scan operations, but the first processing device and the input/output interface between the memory sub-system controller and the host system can transition to sleep mode to reduce active idle power. Subsequently, when a wake-up event occurs, such as receiving a read or write command from the host system, receiving a PCIe reset request from the host system, or any other command from the host system, the processing logic of the first processing device may resume normal operations (e.g., drive activities) for the memory sub-system.

Figure 5B:
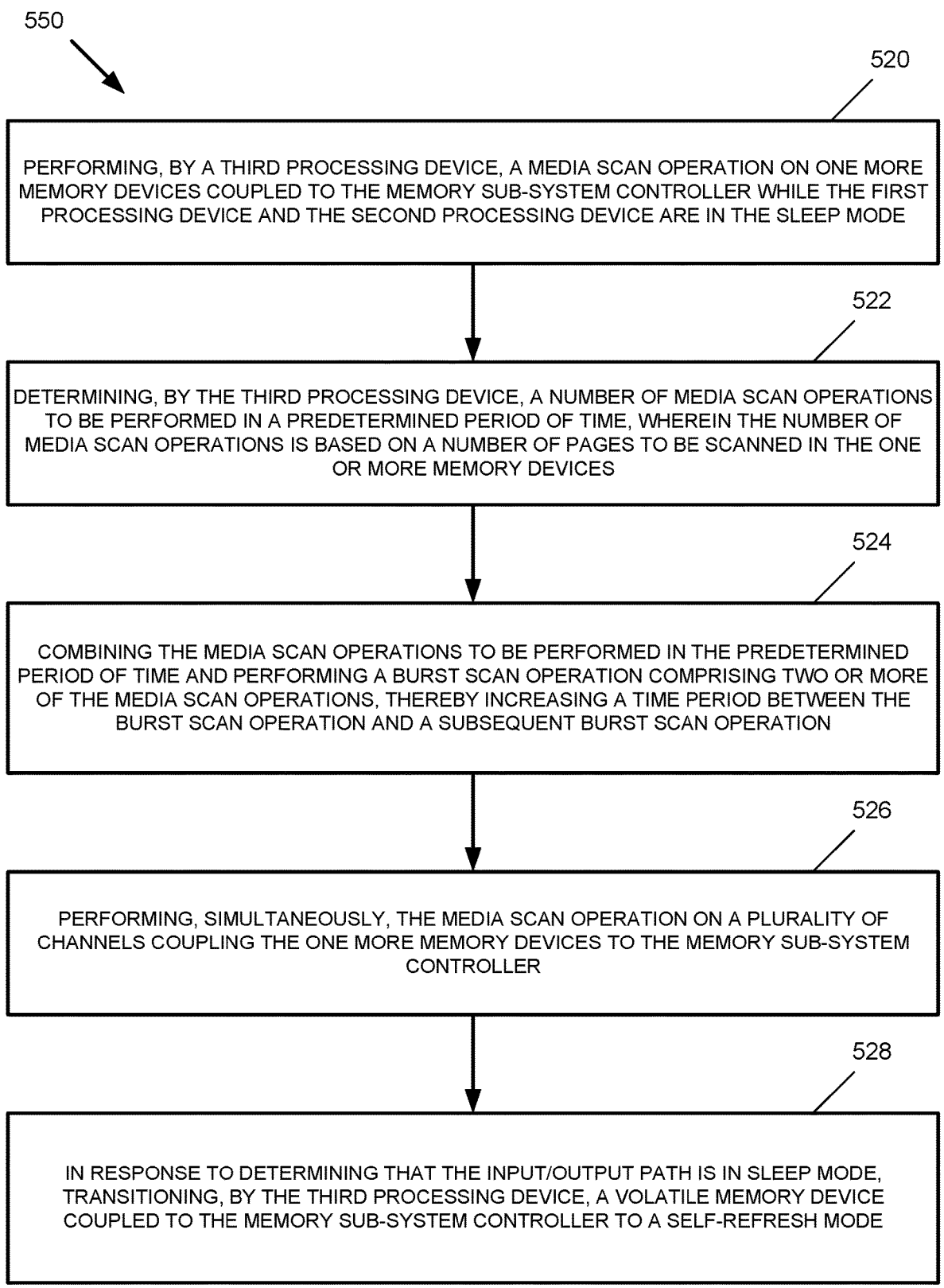
FIG. 5B illustrates a flow diagram of an example method for reducing active idle power in a memory device, in accordance with some embodiments of the present disclosure.

FIG. 5B illustrates example operations in a method 550 for reducing active idle power in a memory device, in accordance with some embodiments. At operation 520, when the first processing device and the second processing device are in sleep mode, the processing logic of a third processing device (e.g., processor 208) may continue to perform media scan operations to maintain data integrity. For example, the media scan operation may include a read operation, a write operation, and or a sensing operation performed on a memory management unit (e.g., a page or a block or a superblock). Under normal operation, processing logic of the third processing device may periodically perform a media scan operation on each ONFI bus channel such that the scan operations are distributed evenly over a certain period of time. At operation 522, the processing logic of the third processing device determines the number of scan operations to be performed on a memory device. The number of scan operations to be performed may depend on the number of pages to be scanned, and this number may vary based on the number of pages in a block, or the number of superpages in a superblock. At operation 524, the processing logic of the third processing device combines two or more media scan operations and performs a burst scan operation such that the sleep interval between one burst scan operation and a subsequent burst scan operation is increased. This not only results in reduced power between burst scan operations but also a burst scan interval between one burst scan cycle (e.g., spanning all memory blocks in the memory device) and the nest burst scan cycle.

At operation 526, when the first processing device and second processing device are in sleep mode, the processing logic of the memory sub-system controller may perform a media scan operation on multiple channels on an ONFI bus connecting the memory sub-system controller and the one or more memory devices, simultaneously. As a result, the scan interval between a first scan operation and subsequent scan operation increases, thereby maintaining the first processing device and the second processing device and the I/O path between the memory controller and the host system in sleep mode for a longer period of time.

In some embodiments, the processing logic of the third processing device combines the media scan operations 524 and 526, in that when the first processing device and the second processing device are in sleep mode, the processing logic of the third processing device may perform burst scan operations on multiple channels on the ONFI bus, simultaneously, such the sleep interval or idle scan interval between one burst scan operation and a subsequent burst scan operation is increased significantly, and subsequently the active idle power of the memory sub-system in sleep mode is reduced. At operation 528, when the input/output path connecting the memory controller and host system is also in sleep mode, the processing logic of the third processing device may transition a volatile memory device coupled to the memory sub-system controller to a self-refresh mode. When in the self-refresh mode, the volatile memory device is able to refresh itself (e.g., via a read or sense operation) at periodic time intervals. Because the frequency of invoking block selection or page selection or the module performing the scan operation is very high, by placing the volatile memory device in self-refresh mode, the third processing device is able to reduce active idle power significantly.

In some embodiment, the controller receives I/O requests over a host interface, which consists of a system I/O bus and the protocol used to communicate along the bus. When an application running on the host system needs to access the memory sub-system, it generates an I/O request, which is sent by the host system over the host controller interface. The memory sub-system controller receives the I/O request, and inserts the request into a queue. The controller uses a scheduling policy to determine the order in which the controller processes the requests that are in the queue. The controller then sends the request selected for scheduling to the FTL. The host controller interface (e.g., NVMe) determines how requests are sent to the memory sub-system and how the requests are queued for scheduling. NVMe directly exposes multiple memory sub-system I/O queues to the applications executing on the host system. By directly exposing the queues to the applications, NVMe simplifies the software I/O stack, eliminating most OS involvement, which in turn reduces communication overheads. A memory sub-system using the NVMe interface maintains a separate set of queues for each application within the host interface. With more queues, the controller has a larger number of requests to select from during scheduling, increasing its ability to utilize idle resources (i.e., channels, dies, planes) and can more easily manage and control the amount of interference that an application experiences from other concurrently executing applications.

Figure 6:
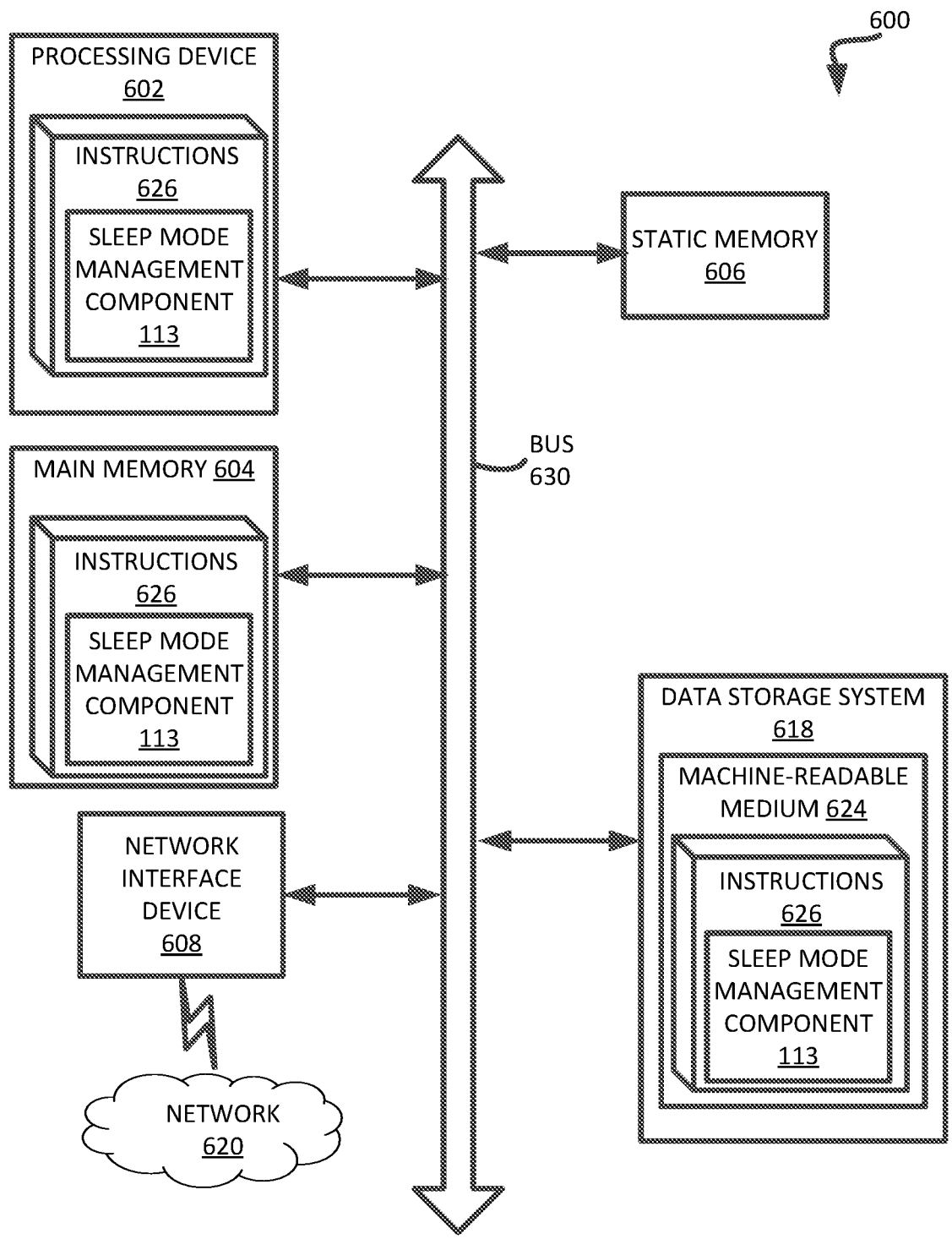
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to sleep mode management component 113, memory sub-system controller 115, or local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to sleep mode management component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
incrementing, by a first processing device in a memory sub-system controller, a first counter when no read or write requests directed to one or more memory devices are received from a host system within a first predetermined period of time;
in response to determining that the first counter has reached a first predetermined threshold value, transitioning the first processing device to a sleep mode;
incrementing, by a second processing device in the memory sub-system controller, a second counter when no read or write requests directed to the one or more memory devices are received from the host system within a second predetermined period of time;

in response to determining that the second counter has reached a second predetermined threshold value, transitioning the second processing device to the sleep mode; and in response to determining that the second processing device is in sleep mode, transitioning, by the first processing device, an input/output path coupling the memory sub-system controller and the host system to the sleep mode.

2. The method of claim 1, further comprising:
in response to detecting a wake-up event, transitioning, by the first processing device, the second processing device and the input/output path to an active mode.

3. The method of claim 2, wherein the wake-up event comprises one or more of: receiving a read or write command from the host system, or receiving a PCIe reset request from the host system.

4. The method of claim 1, further comprising:
performing, by a third processing device of the memory sub-system controller, a media scan operation on the one more memory devices coupled to the memory sub-system controller while the first processing device and the second processing device are in the sleep mode.

5. The method of claim 4, wherein the first processing device comprises an input/output read processor, the second processing device comprises a flash translation layer processor, and the third processing device comprises a back end processor.

6. The method of claim 4, wherein the media scan operation comprises one or more of a read operation, a write operation, or a sense operation.

7. The method of claim 4, wherein performing the media scan operation on one more memory devices further comprises:
determining, by the third processing device, a number of media scan operations to be performed in a predetermined period of time, wherein the number of media scan operations is based on a number of pages to be scanned in the one or more memory devices; and
combining the media scan operations to be performed in the predetermined period of time and performing a burst scan operation comprising two or more of the media scan operations, thereby increasing a time period between the burst scan operation and a subsequent burst scan operation.

8. The method of claim 4, wherein performing the media scan operation on one more memory devices further comprises:
determining, by the third processing device, a number of media scan operations to be performed in a predetermined period of time, wherein the number of media scan operations is based on a number of pages to be scanned in the one or more memory devices; and
performing, simultaneously, the media scan operation on a plurality of channels coupling the one more memory devices to the memory sub-system controller.

9. The method of claim 4, further comprising:
in response to determining that the input/output path is in sleep mode, transitioning, by the third processing device, a volatile memory device coupled to the memory sub-system controller to a self-refresh mode.

10. A system comprising:
a memory device; and
a processing device, operatively coupled with the memory device, to perform operations comprising:

incrementing a first counter when no read or write requests directed to the memory device are received from a host system within a first predetermined period of time;

in response to determining that the first counter has reached a first predetermined threshold value, transitioning a first processing unit in a memory sub-system controller to a sleep mode;

incrementing a second counter when no read or write requests directed to the memory device are received from the host system within a second predetermined period of time;

in response to determining that the second counter has reached a second predetermined threshold value, transitioning a second processing unit in the memory sub-system controller to the sleep mode; and in response to determining that the first processing unit and the second processing unit are in sleep mode, transitioning an input/output path coupling the memory sub-system controller and the host system to the sleep mode.

11. The system of claim 10, wherein the operations further comprise:
in response to detecting a wake-up event, transitioning the first processing unit, the second processing unit, and the input/output path to an active mode.

12. The system of claim 11, wherein the wake-up event comprises one or more of: receiving a read or write command from the host system, or receiving a PCIe reset request from the host system.

13. The system of claim 10, wherein the operations further comprise:
performing a media scan operation on one more memory devices coupled to the memory sub-system controller while the first processing unit and the second processing unit are in the sleep mode.

14. The system of claim 13, wherein the first processing unit comprises an input/output read processor and the second processing unit comprises a flash translation layer processor.

15. The system of claim 13, wherein performing the media scan operation on one more memory devices further comprises:
determining a number of media scan operations to be performed in a predetermined period of time, wherein the number of media scan operations is based on a number of pages to be scanned in the one or more memory devices; and
combining the media scan operations to be performed in the predetermined period of time and performing a burst scan operation comprising two or more of the media scan operations, thereby increasing a time period between the burst scan operation and a subsequent burst scan operation.

16. The system of claim 13, performing the media scan operation on one more memory devices further comprises:
determining a number of media scan operations to be performed in a predetermined period of time, wherein the number of media scan operations is based on a number of pages to be scanned in the one or more memory devices; and
performing, simultaneously, the media scan operation on a plurality of channels coupling the one more memory devices to the memory sub-system controller.

17. A non-transitory computer-readable storage medium comprising instructions that, when executed by a processing device, cause the processing device to perform operations comprising:
- incrementing a first counter when no read or write requests directed to one or more memory devices are received from a host system within a first predetermined period of time;
- in response to determining that the first counter has reached a first predetermined threshold value, transitioning a first processing unit in a memory sub-system controller to a sleep mode;
- incrementing a second counter when no read or write requests directed to the one or more memory devices are received from the host system within a second predetermined period of time;
- in response to determining that the second counter has reached a second predetermined threshold value, transitioning a second processing unit in the memory sub-system controller to the sleep mode; and
- in response to determining that the first processing unit and the second processing unit are in sleep mode, transitioning an input/output path coupling the memory sub-system controller and the host system to the sleep mode.

18. The non-transitory computer-readable storage medium of claim 17, wherein the operations further comprise:
- performing a media scan operation on one more memory devices coupled to the memory sub-system controller while the first processing unit and the second processing unit are in the sleep mode.

19. The non-transitory computer-readable storage medium of claim 18, wherein performing the media scan operation on one more memory devices further comprises:
- determining a number of media scan operations to be performed in a predetermined period of time, wherein the number of media scan operations is based on a number of pages to be scanned in the one or more memory devices; and
- combining the media scan operations to be performed in the predetermined period of time and performing a burst scan operation comprising two or more of the media scan operations, thereby increasing a time period between the burst scan operation and a subsequent burst scan operation.

20. The non-transitory computer-readable storage medium of claim 18, wherein performing the media scan operation on one more memory devices further comprises:
- determining a number of media scan operations to be performed in a predetermined period of time, wherein the number of media scan operations is based on a number of pages to be scanned in the one or more memory devices; and
- performing, simultaneously, the media scan operation on a plurality of channels coupling the one more memory devices to the memory sub-system controller.

* * * * *